JOSEPH LANE.
Improvement in Fruit Gatherers.
No. 124,000.  Patented Feb. 27, 1872.
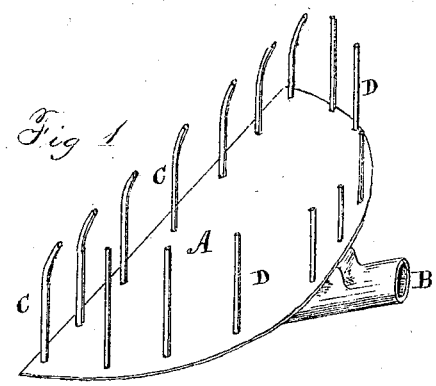
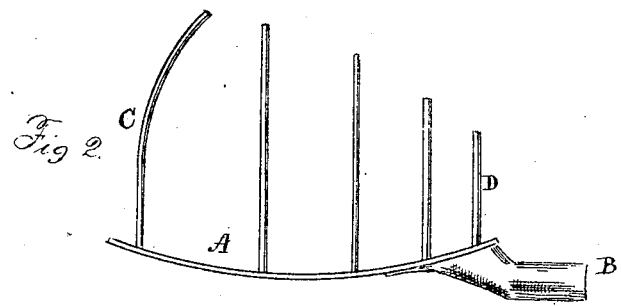

124,000

UNITED STATES PATENT OFFICE.

JOSEPH LANE, OF CHICAGO, ILLINOIS.

IMPROVEMENT IN FRUIT-GATHERERS.

Specification forming part of Letters Patent No. 124,000, dated February 27, 1872; antedated February 10, 1872.

SPECIFICATION.

I, JOSEPH LANE, of the city of Chicago, in the county of Cook and State of Illinois, have invented a certain new and useful Device or Implement for Gathering Vegetables or Fruits, of which the following is a full description, reference being had to the accompanying drawing making a part of this specification, in which—

Figure 1 is a perspective view, and Fig. 2 a cross-section.

The object of my invention is to construct a gatherer for potatoes, apples, pea-nuts, or other things to which it may be adapted, so that vegetables or fruits may be retained and the dirt, leaves, or vines pass out; and its nature consists in arranging a back-plate nearly in line with the handle, and in providing such back-plate with curved teeth in front and straight teeth or open-work around the balance of the margin of the back-plate.

To enable others skilled in the art to make and use the same, I will describe it with reference to the drawing, in which—

A is the back-plate; B, an eye or goose-neck for attaching the handle; C, the curved front teeth; and D, the straight teeth around the margin. The back-plate A is made of plate-steel, malleable cast-iron, or other suitable material; and, if preferred, it may be made with perforations or openings to facilitate the passage of dirt, &c. The curved teeth C are made of steel or other suitable material, and are made from four to twelve inches in length and set about three-fourths of one inch apart, the distance to be regulated by the nature of the required service; and for some purposes it may be found best to make the teeth C straight and the teeth D curved. The marginal teeth D may be made of iron or other suitable material, and are usually made straight. They may, however, be made curved, if desired; and they are made to gradually diminish in length from the curved front teeth to the eye or neck B, as shown, and are set about the same distance apart as the others. A straight handle is applied, and in use the person stands erect so as to bring the teeth C nearly horizontal, using just sufficient incline to bring the teeth under the vegetables or fruit, and when as many are gathered as the device will conveniently hold it is lifted into the position shown at Fig. 1, when, if it is found to contain dirt or leaves, it is shaken till they pass out, when the remaining contents are deposited in a basket, wagon or other receptacle.

By the use of this implement or device vegetables or fruits can be gathered rapidly and without stooping.

The teeth D may be inserted by suitable screw-threads, or by screw and nut; or they may be attached to a separate plate or a segment, so as to be detachable together.

What I claim as new, and desire to secure by Letters Patent, is—

The herein-described implement, consisting of the plate A, provided with the teeth C D, and the socket or tang B, constructed and arranged to operate as and for the purpose set forth.

JOSEPH LANE.

Witnesses:
L. L. BOND,
O. W. BOND.